No. 774,343. PATENTED NOV. 8, 1904.
H. & J. H. THIEDEMANN.
DRAFT EVENER.
APPLICATION FILED MAY 23, 1904.
NO MODEL.

No. 774,343. Patented November 8, 1904.

UNITED STATES PATENT OFFICE.

HINRY THIEDEMANN AND JURGEN HINRICH THIEDEMANN, OF HICKMAN, NEBRASKA.

DRAFT-EVENER.

SPECIFICATION forming part of Letters Patent No. 774,343, dated November 8, 1904.

Application filed May 23, 1904. Serial No. 209,259. (No model.)

*To all whom it may concern:*

Be it known that we, HINRY THIEDEMANN and JURGEN HINRICH THIEDEMANN, citizens of the United States, residing at Hickman, in the county of Lancaster and State of Nebraska, have invented new and useful Improvements in Draft-Eveners, of which the following is a specification.

Our invention relates to a draft evener or equalizer, and has for its object to provide a simple and effective device of this kind to evenly distribute the pull of three or four horses.

A further object is to provide a construction whereby the evener can be readily connected to a plow, harvester, or other implement and can be worked to the right or left.

Improved details in the construction and arrangements of the various parts of the invention will be apparent from the detailed description hereinafter when read in connection with the appended claims, reference being had to the accompanying drawings, forming part hereof, in which—

Figure 1:
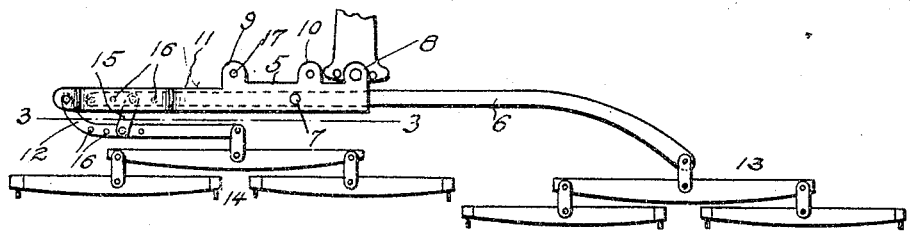
Figure 2:
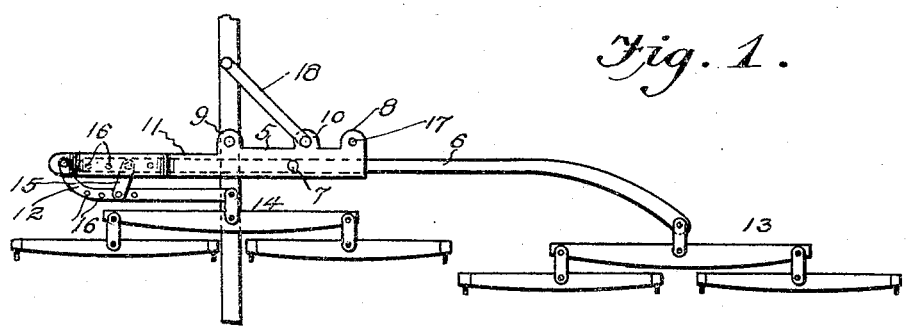
Figure 3:
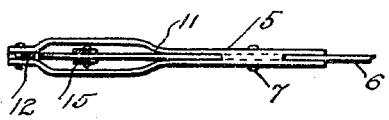

Figures 1 and 2 are plan views of the evener, showing its application in connection with a plow and harvester, respectively. Fig. 3 is a sectional view on the line 3 3 of Fig. 1.

Referring specifically to the drawings, 5 denotes a supporting-frame, in which the evener-lever 6 is pivoted, as at 7. The frame is open in front sufficiently to permit movement of the lever, and in the rear it has lugs for attachment to the plow-beam, harvester-tongue, or other implement. The lugs are on each end of the frame, as at 8 and 9, respectively, and another lug, 10, between these is also provided for a purpose to be described. The frame 5 is extended on one end, as at 11, and to the outer end thereof a lever 12 is pivoted. The long arm of the evener-lever 6 extends outwardly from the opposite end of the frame and carries at its outer end a doubletree 13. The lever 12 extends in front of the frame and also carries a doubletree 14. The short arm of the evener-lever extends between the portion 11 of the frame 5 and is connected by a link 15 to the lever 12. The link can be adjusted to regulate the leverage, the levers 6 and 12 having a number of perforations 16 for this purpose, the link being secured by pins or bolts extending therethrough. The front and rear ends of the extension 11 of the frame 5 are open to permit movement of the parts therebetween.

When the evener is attached to a plow, as shown in Fig. 1, it is fastened to the clevis thereof by a pin through one of the lugs 8 or 9, they being provided with holes 17 for that purpose. By reversing the frame 5 and attaching it to the clevis by the opposite lug it can be worked on the opposite side, whereby we are enabled to work the evener on either the right or left side.

Fig. 2 shows the evener connected to the tongue of a harvester. In this case it is fastened to the tongue by a pin through one of the lugs 8 or 9, as before. A brace 18 also extends from the tongue and is fastened to the lug 10 to take up side draft. The evener can also be reversed, as heretofore stated, and worked on either side.

A swingletree can be substituted for the doubletree 13 when three horses are used, the link 15 being adjusted to regulate the leverage.

Having thus described our invention, what is claimed as new, and desired to be secured by Letters Patent, is—

1. A draft-evener comprising a supporting-frame having attaching-lugs at its rear end, an evener-lever pivoted in the frame, the long arm of said lever extending outwardly from one end of the frame and carrying at its outer end a whiffletree, a lever pivoted to the opposite end of the frame and extending in front thereof and carrying a whiffletree, and an adjustable connection between said lever and the short arm of the evener-lever.

2. A draft-evener comprising a reversible supporting-frame having attaching-lugs at its rear end, an evener-lever pivoted in the frame, the long arm of said lever extending outwardly from one end of the frame and carrying at its outer end a whiffletree, a lever pivoted to the opposite end of the frame and extending in front thereof and carrying a whiffletree, and an adjustable connection between said lever and the short arm of the evener-lever.

3. The combination with a harvester-tongue, of a frame having perforated lugs at its rear end for attachment thereto, a brace extending from the tongue to the frame, an evener-lever pivoted in the frame, the long arm of said lever extending outwardly from one side of the frame and carrying at its outer end a whiffletree, a lever pivoted to the opposite side of the frame and extending in front thereof and carrying a whiffletree, and an adjustable connection between said lever and the short arm of the evener-lever.

In testimony whereof we have signed our names to this specification in the presence of two subscribing witnesses.

HINRY THIEDEMANN.
JURGEN HINRICH THIEDEMANN.

Witnesses:
JOHN G. LEFFERDINK,
D. H. NIEMANN.